Nov. 26, 1935.  W. F. HOERLE  2,022,348
BALL BEARING SKATE WHEEL
Filed Dec. 2, 1933
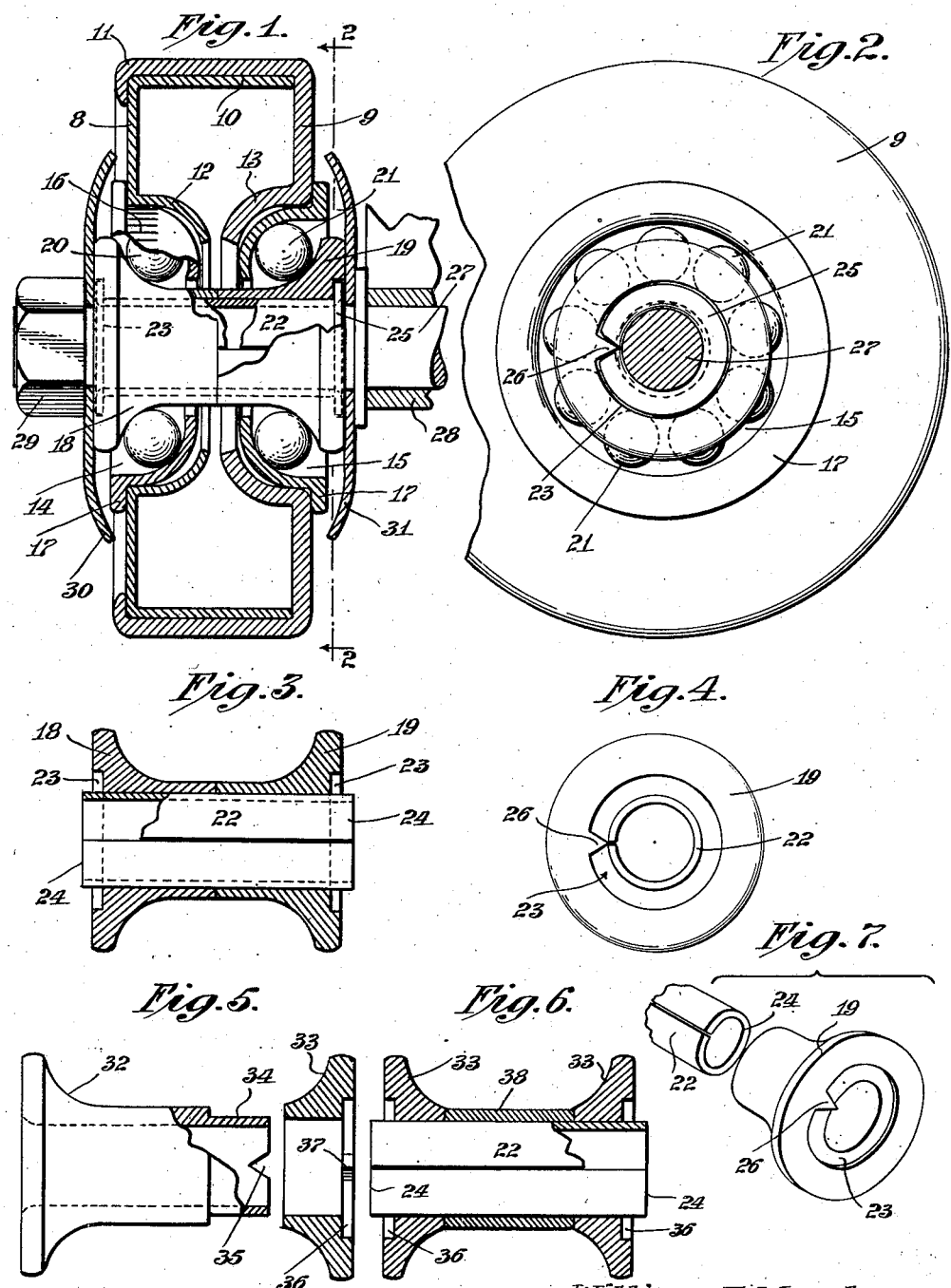
William F. Hoerle
INVENTOR
ATTORNEY Patented Nov. 26, 1935

2,022,348

UNITED STATES PATENT OFFICE 2,022,348

BALL BEARING SKATE WHEEL

William F. Hoerle, Torrington, Conn., assignor to Union Hardware Company, Torrington, Conn., a corporation of Connecticut Application December 2, 1933, Serial No. 700,696

7 Claims. (Cl. 208—181)

My invention relates particularly to ball bearing wheels of the character set forth in the Bryant and Hoerle Patent No. 1,330,579 dated February 10, 1920.

The main object is to provide a cheap but more rigid and durable construction.

A special object is to provide a construction, the parts of which can be made and assembled more cheaply and with greater uniformity.

In carrying out the invention in its preferred form the rotor is made up of a number of parts and provided with two spaced apart outwardly facing ball races. The stationary hub consists of two parts united by a tubular member. This tubular member is preferably split and has its opposite ends spun out or flanged into shallow recesses in the outer faces of the parts which support the ball bearings in the ball races of the rotor. These hub parts are provided with projections which constitute means for preventing the rotation of the hub parts on the tubular member. This construction is subject to variations as will be seen from the following specification and accompanying drawing.

Fig. 1 is a transverse sectional view of a rotor with the hub members partly in section and partly in side elevation and mounted on a stationary shaft.

Fig. 2 is a side view and section taken generally on the plane of the line 2—2 of Fig. 1.

Fig. 3 is a sectional view of the hub with the tubular support in place but unattached.

Fig. 4 is an end view of the same.

Fig. 5 is a side view and partial section of the separated parts of a modified form of hub.

Fig. 6 is a longitudinal sectional view of another modification of hub with the tubular support in place but unattached.

Fig. 7 is a perspective view showing one of the hub parts and the adjacent end of a tubular member.

The rotor consists in the form shown of two disc-like members 8 and 9 having interfitting parts 10 and 11, the outer one of which forms the tread and may be flanged at its edge to permanently connect the parts. These two parts have inwardly formed sockets 12 and 13 into which bearing rings 14 and 15 are inserted and suitably secured in place as, for instance, by providing the outer walls of the bearing rings with toothed portions 16 adapted to cut into the walls of the socket members. Each bearing ring is provided with a peripheral flange 17 which limits the inward insertion of the bearing ring into its socket.

In the preferred form the hub is made up of two parts 18 and 19 which are exactly alike. These may be stamped, drawn or turned out of steel with raceways of proper shape to coact with the ball bearings 20 and 21 which travel in the raceways of the bearing rings 14 and 15. Preferably, of course, the bearing rings and the hub parts 18 and 19 are formed of steel and properly hardened and tempered. The two parts are mounted upon and connected together by a tubular member 22 which is preferably formed of sheet metal curled into a tube which is inserted through the parts of the hub and has its ends 24 flanged over into the recesses 23 in the outer faces of the hub parts. These flanged ends as indicated at 25 are seated wholly or partly in the recesses depending upon the relative depth and the thickness of the flanges. A projection 26 in the end of the hub part extends into the space formed by the bending over of the corners of the flange at the joint as shown in Fig. 2. The parts are thus prevented from relative rotation.

It will be seen that this construction forms a bearing of maximum length throughout the hub for a most effective support of the shaft 27. This shaft is usually supported by a bracket or hanger 28 and the parts clamped together by the adjustment of a nut 29. Dust guards or washers 30 and 31 are also preferably provided to protect the bearing.

In the form shown in Fig. 5 the hub is made up of the bearing parts 32 and 33 which are connected together by a tubular extension 34 which is integral with the part 32 and extends through the part 33 and has its end flanged over in a manner similar to the flange 25. In this case the tubular extension 34 is slotted or notched at 35 and the recess 36 is provided in the outer face of the bearing member 33. The projection 37 corresponds to the projection 26 previously described and serves to coact with the walls of the notch 35 when the end of the tubular portion 34 is flanged over into the recess 36.

In the form shown in Fig. 6 the two bearing members 33, 33 correspond with the bearing member 33 of Fig. 5. These two hub parts are held spaced apart by the sleeve 38 and the three members are connected by a split tube 22 such as previously described.

I claim:

1. As an article of manufacture, a hub construction for a ball bearing roller skate wheel comprising a tubular hub member having a notched edge on at least one end thereof, a cone-bearing member on the notched end of the tubular member and having a recess in its outer face and a teat extending from the wall of the recess into said recess and adapted to interlock with the opposite walls of the notch in the end of the tubular member to prevent the tubular hub member and the cone-bearing member from relative movement.

2. As an article of manufacture, a hub construction for a ball bearing wheel comprising a tubular hub member having at least one of its end edges flanged and notched, a flanged-bearing member on each end of the tubular member forming outer bearing members for anti-friction ball bearings, each of said bearing members having a recess in its outer end face portion and having a teat extending from the outer end of the bearing and defining the side walls of said recess and being adapted to interlock with the edge walls of the notch in the flanged end of the tubular member to prevent relative movement of the tubular hub member and bearing member.

3. As an article of manufacture, a hub construction for a ball bearing wheel comprising a split tubular hub member having a flanged end, a flanged-bearing member on each end of the tubular member forming outer bearing members for anti-friction ball bearings, each of said bearing members having a recess in its outer end face portion and having a teat extending from the outer end of the bearing and forming walls of the recess and being adapted to interlock with the edge walls of the split in the flanged end of the tubular hub member to prevent relative movement of the tubular member and bearing members.

4. As an article of manufacture, a hub construction for a ball bearng roller skate comprising a split tubular hub member, a cone bearing member on each end of the tubular member forming outer bearing members for anti-friction ball bearings and a sleeve on said tubular member for keeping said cone bearing members in spaced relationship, each of said cone-bearing members having a recess in its outer face portion and having a projection extending from the wall of the recess into the recess adapted to interlock with the edge walls of the split in the tubular hub member to prevent relative movement between the tubular member and the cone-bearing members.

5. As an article of manufacture, an outer bearing for a wheel, said bearing being conical, a peripheral flange at an end of the bearing and having a ball race surface on the inner side thereof, a split tube inside of said bearing, said flange having a shallow recess in its outer face surrounding the end of said tube, a teat extending inwardly from said recess and forming the side walls of said recess whereby when said split tube is spread outwardly toward the end face of said flange the adjacent edges of the split at the end of the inner tube will extend on opposite sides of the teat.

6. As an article of manufacture, a hub construction for a ball bearing wheel comprising a split tubular hub member having a flanged-over end, a cone-bearing member on at least one end thereof and having a recess in its outer end face, the surface of the bottom of the recess being flat and a teat projecting from the outer end of the bearing and defining two walls of the recess and being adapted to interlock with the opposite walls of the split in the flanged-over end of the tubular member to prevent the tubular hub member and the bearing member from relative movement.

7. In a ball bearing wheel having a tread member and an axle, a hub member including a split tubular inner member and a flanged outer ball bearing member, a face of said flange being recessed, said recess having a flat bottom surface, and said flange having a teat, the side walls of which define side walls of the recess, and the tubular member having a flange adapted to be positioned in the recess in abutting relation to all of the walls and the bottom of the recess.

WILLIAM F. HOERLE.